United States Patent
Lavers et al.

(10) Patent No.: US 7,411,150 B2
(45) Date of Patent: Aug. 12, 2008

(54) METHOD OF PRODUCING A COMPOSITE COMPONENT

(75) Inventors: Fergus Lavers, Dungourney (IE); Uri Sela, Thalwil (CH)

(73) Assignee: ALSTOM Technology Ltd., Baden (CH)

( * ) Notice: Subject to any disclaimer, the term of this patent is extended or adjusted under 35 U.S.C. 154(b) by 0 days.

(21) Appl. No.: 11/009,036

(22) Filed: Dec. 13, 2004

(65) Prior Publication Data

US 2005/0173388 A1   Aug. 11, 2005

Related U.S. Application Data

(63) Continuation of application No. PCT/EP03/50214, filed on Jun. 4, 2003.

(30) Foreign Application Priority Data

Jun. 12, 2002   (GB)   ................... 0213475.7

(51) Int. Cl.
*B23K 26/38* (2006.01)
*B23H 9/14* (2006.01)

(52) U.S. Cl. ................. 219/121.71; 205/665; 219/69.17

(58) Field of Classification Search ............ 219/69.17, 219/121.71, 121.69, 121.72; 205/665
See application file for complete search history.

(56) References Cited

U.S. PATENT DOCUMENTS

| | | | |
|---|---|---|---|
| 3,622,740 A * | 11/1971 | Ravussin et al. ....... | 219/121.67 |
| 4,808,785 A | 2/1989 | Mosavi et al. | |
| 4,818,834 A * | 4/1989 | Rupert ..................... | 219/69.17 |
| 4,998,260 A * | 3/1991 | Taniura ..................... | 372/107 |
| 5,177,037 A | 1/1993 | Schuldies | |
| 5,216,808 A * | 6/1993 | Martus et al. ............... | 29/889.1 |
| 5,418,345 A * | 5/1995 | Adamski ................. | 219/69.17 |
| 5,609,779 A * | 3/1997 | Crow et al. ............ | 219/121.71 |
| 6,172,331 B1 * | 1/2001 | Chen ..................... | 219/121.71 |
| 6,246,025 B1 * | 6/2001 | Scott ........................ | 219/121.7 |
| 6,307,175 B1 * | 10/2001 | Blochlinger et al. ... | 219/121.71 |

(Continued)

FOREIGN PATENT DOCUMENTS

DE   274 999   1/1990

(Continued)

OTHER PUBLICATIONS

Search Report for Britain Appl. No. GB 0213475.7 (Jul. 31, 2002).

(Continued)

*Primary Examiner*—Geoffrey S Evans
(74) *Attorney, Agent, or Firm*—Cermak Kenealy & Vaidya LLP; Adam J. Cermak

(57) ABSTRACT

A composite component (1), such as a turbine airfoil, includes a conductive portion (2), and a non-conductive portion (5), such as a thermal barrier coating or a wear protection coating, or both. In machining the component, a laser machining step is applied for machining the non-conductive portion, and an electro-machining step is applied for machining the conductive portion. The laser machining step is performed by applying preferably a high-frequency pulsed laser. The focussed laser beam working diameter ($D_L$) is essentially smaller than the size of the contour (16) to be machined. The contour is scanned by the laser beam (9) along a pre-defined trace (17) thus literally inscribing the desired contour into the workpiece.

19 Claims, 5 Drawing Sheets

U.S. PATENT DOCUMENTS

| | | | | |
|---|---|---|---|---|
| 6,420,677 B1 * | 7/2002 | Emer et al. | ............ | 219/121.71 |
| 6,433,305 B1 * | 8/2002 | Liu et al. | ................ | 219/121.71 |
| 6,573,474 B1 * | 6/2003 | Loringer | ................ | 219/121.71 |
| 6,627,844 B2 * | 9/2003 | Liu et al. | ................ | 219/121.71 |
| 6,630,645 B2 * | 10/2003 | Richter et al. | .......... | 219/121.71 |
| 6,744,010 B1 * | 6/2004 | Pepe et al. | ............. | 219/121.71 |

FOREIGN PATENT DOCUMENTS

| | | | | |
|---|---|---|---|---|
| EP | 0 366 466 | | | 5/1990 |
| GB | 2355222 A | * | | 4/2001 |
| JP | 3-251323 | | | 8/1991 |
| JP | 5-208323 | | | 8/1993 |
| JP | 2000-141069 A | * | | 5/2000 |
| WO | 97/10071 | | | 3/1997 |

OTHER PUBLICATIONS

International Search Report for PCT Appl. No. PCT/EP03/50214 (Oct. 2, 2003).

International Preliminary Examination Report for PCT Appl. No. PCT/EP03/50214 (Sep. 14, 2004).

* cited by examiner

METHOD OF PRODUCING A COMPOSITE COMPONENT

METHOD OF PRODUCING A COMPOSITE COMPONENT

This application is a Continuation of, and claims priority under 35 U.S.C. § 120 to, International Application number PCT/EP03/50214, by the inventors hereof, filed 4 Jun. 2003, and claims priority under 35 U.S.C. § 119 to GB application number 0213475.7, filed 12 Jun. 2002, the entireties of both of which are incorporated by reference herein.

BACKGROUND OF THE INVENTION

1. Field of the Invention

The present invention relates to a method for producing a composite component, to a composite component which is produced by applying said method, and to a turbomachine, in particular a gas turbine, comprising such a composite component.

2. Brief Description of the Related Art

Electro discharge machining (EDM) and electro chemical machining (ECM) are well-known methods of machining. EDM and ECM are generally used to machine a workpiece in which high precision is required in machining high-hardness materials, at the same time avoiding local thermal load during the machining step, such as, for example, in machining a component for a turbine. The methods are in particular used to produce cooling holes, such as the holes through which film cooling air flows during operation.

In EDM at least one electrode is held in close proximity to the workpiece and electrical sparks are generated between the workpiece and the electrode due to a difference in electrical potential. The sparks cause the material of the workpiece to erode. In ECM a workpiece acts as an electrode which is coupled electrically to a further electrode by means of an electrolyte. Especially with ECM freeform geometries can be machined.

It is thus clear that the surface of the workpiece must be electrically conductive in order to use EDM or ECM. Therefore, difficulties arise when it is necessary to machine a workpiece formed from a composite. Such composites often contain electrically non-conductive materials, such as ceramics. It is particularly common for one or more electrically non-conductive materials to be provided as a coating on or around a metal substrate in order to protect the metal substrate from, for example, heat, corrosion, chemical corrosion, and/or wear during use. This is highly relevant to industries such as the aerospace and power generation industries, where turbine blades are required to operate at very high speeds and temperatures.

Several methods have been proposed in the art to facilitate the use of electro machining methods with composites including electrically non-conductive materials, such as coatings.

EP 0 366 466 discloses a method of EDM in which a composite workpiece is first machined using ultrasonic drilling, in order to remove an amount of electrically non-conductive material, and so to provide access to an underlying electrically conductive material. EDM can then be carried out on the electrically conductive material in the usual manner. A disadvantage of this technique is that the ultrasonic drilling can only be carried out perpendicular to the surface to be machined, which limits its applicability to only certain structural configurations for the workpiece.

U.S. Pat. No. 5,177,037 describes types of composite ceramics which have been rendered electrically conductive by the inclusion of metal and/or carbon. It is also known to dope electrically non-conductive materials with a suitable electrolytic fluid, in order to render the materials electrically conductive. EDM can then be applied to the electrically conductive composite. However, doping of the material in this way can affect the integrity of the coating, which is obviously undesirable. Furthermore, substantial washing of the material is required to remove traces of the dopant. This complicates the manufacturing process considerably. The concentration and distribution of the dopant in the material is relatively difficult to control. Thus, it is possible that the inclusion of the dopant will not achieve the necessary electrical conductivity From DD 274 999 and U.S. Pat. No. 4,818,834, among others, methods are known where laser drilling methods are used to machine a non-conductive ceramic coating to expose the conductive substrate, which is then available for electro machining, such as ECM or EDM. However, applying conventional laser drilling methods the achievable geometry is limited to basically circular cross sections, including an elliptical opening on the component surface, subject to the angle of incidence of the laser beam on the surface. Furthermore, with the known technique, the diameter of the hole to be produced is essentially restricted to the laser beam diameter in the working range. Moreover, due to the high thermal energy applied, and due to the fact that the working range of the drilling laser, may extend into the metallic substrate, also the metallic substrate is at least partly, subject to some extent to laser machining, and is at least subject to local thermal loading. As a consequence, the structure of a metallic substrate is subject to highly undesirable structural transformations. The adherence between a laser machined coating and a metallic substrate is locally severely weakened, giving rise to potential subsequent damages: In the end, current laser drilling methods are after all thermal machining methods, and this is exactly what shall initially be avoided in applying electro machining methods. The precision of the geometry is limited, and currently, for example in producing cooling air holes, tolerances in the cooling air mass flow through a hole due to the manufacturing process of the cooling holes, are in an order of magnitude of ±10% of a mean mass flow, in spite of the high precision achievable by electro machining.

Summarizing, although the combined manufacturing process described above, is widely used and was found to work all in all satisfactory, latest developments, in particular in gas turbine technology, have lead to increasing demands for precise cooling air control and best mechanical component integrity, and have thus triggered a strong desire for improvement to avoid or at least minimize the drawbacks related to the present art cited above.

SUMMARY OF THE INVENTION

It is thus an object of the invention to overcome the aforementioned disadvantages of the prior art.

One aspect of the present invention is to provide a method as aforementioned, which allows for the high precision machining of freeform geometries in a composite workpiece, such as the manufacturing of film cooling holes in a metallic turbine airfoil having a thermal barrier coating on its outer surface.

Advantageous embodiments and applications in accordance with principles of the present invention are disclosed herein.

One of many principles underlying the invention thus is not to use a focussed high energy laser beam and let it simply "burn" through the non-conductive portion of the composite component, but to use a focussed laser equipment with a focus diameter substantially smaller than the geometry to be produced, and then scanning the desired contour with the laser beam in essentially leading the focus of the laser beam over the non-conductive surface thus rather literally inscribing the desired geometry into the non-conductive portion of the composite component, and thereby ablating the non-conductive material. One possibility to carry out this step of the process is to lead the laser focus over the surface in a multitude of essentially parallel, slightly offset tracks, until the area of the desired geometry has been completely covered. This may be repeated in a direction which is essentially perpendicular to the direction of the first set of tracks. The motion of the focus can in one embodiment be achieved in applying a moveable deflection assembly, such as a mirror or a system of mirrors; prisms or a moveable end optical fiber might likewise be applied, provided the transmission of the high energy laser beam through an optical fiber can be achieved without excessive energy loss and potential destruction of the fiber. Anyhow, laser systems which can readily be programmed to lead a focussed laser beam over a workpiece surface to engrave a pre-defined geometry are commercially available, and are commonly applied to engrave writings or markages. Such systems are thus considered as state of the art, well-known to the skilled person, and do consequently not require any further detailed description. It is also assumed in this context, that the laser focus being "substantially smaller" than the geometry to be produced has a clear meaning for the skilled person, i.e. the focus must be small enough not to interfere with the geometry to be produced. This depends on the size and complexity of the geometry to be produced, i.e. the sharper edges are desired, the smaller the focus must be. In other words, the "spatial frequency" of the applied beam must be larger than the spatial frequency spectrum of the desired geometry. It can be said, that, as a rule of thumb, the utilized beam diameter should be smaller by approximately a factor of 3, for example 5 or higher, for elliptic or round geometries, or, more generally geometries having smooth contours, and at least an order of magnitude, for example a factor in excess of 25 for geometries having edges contours. As a further rule of thumb, the laser intensity has to be higher than $2 \cdot 10^8$ W/cm$^2$ to be able to evaporate the material immediately. Focus diameters of 200 microns to 300 microns, are desirable for the production of round shaped cooling air holes having cross sectional dimensions roughly in a range from some tenths of millimeters to some millimeters, as processing time is then kept really short. A small focus diameter moreover considerably enhances the precision of machining, especially when machining non-circular geometries. The invention allows for a high precision laser machining of non-circular and non-elliptic and edges openings in the non-conductive portion of a composite component, as well as short processing times for circular holes. The beam diameter is widely understood as the diameter of the central part of the focusing Airy pattern. It is furthermore rather advantageous, in particular, where a non-conductive portion covering a conductive portion of a composite workpiece is machined, to optionally continuously control the depth of the laser machining in order to avoid undesired laser machining of the conductive portion, i.e., a metallic substrate. In one embodiment of the invention a so-called conoscopic probe is utilized for depth control. Such probes are for example off-shelf available from the Irish company Optimet, and are thus considered as well-known state of the art without further discussion.

The process might comprise the step of swiveling the laser beam to various incidence angles as measured against the machined component surface. This allows the machining of three-dimensional freeform geometries.

It has been moreover desirable to switch the laser alternately, thus pulsing the laser, preferably at a modulation frequency in excess of 500 Hz, for example between 3 kHz and 50 kHz. This can for example be achieved in applying a Q-switched laser. The application of short laser pulses reminds of sparks in EDM machining processes. As with each short pulse of comparably high laser energy a tiny piece of material is removed, the process might well be referred to as Laser erosion machining, as opposed to laser drilling or laser cutting. With the latter methods heat caused by the laser energy is applied for a long enough time frame, so that heat can affect a rather large area of the workpiece; for example to remove a ceramic TBC from a metallic substrate to a sufficient extent to expose the metallic substrate for electro machining would mean to heat to substrate at its surface at least close to melting, if not partial melting and resolidification is caused. This has very negative effects on the microscopic metal structure and also on the strength of adherence of substrate and coating. Due to the short application of energy in the method according to the invention, the effects of the laser machining step are locally limited, and no or only minor, irrelevant heat flux into the component is caused.

It is furthermore found, that rather surprisingly machining can even be carried out at very flat angles of incidence. Compared with state of the art laser machining processes, which were limited to comparable steep angles of incidence above 21 degrees, as measured against the component surface, due to the reflection of the laser, the method according to the invention allows for machining at angles of incidence as low as 12 to 15 degrees.

In one embodiment of the invention the two machining steps are carried out on different tooling machines. This considerably enhances the utilization of the respective tools, speeds up production, as both machining steps are carried out on different workpieces, but simultaneous, and consequently lowers production cost. Precise positioning of the workpiece on either machine is then a problem the man of ordinary skill is able to solve applying his common knowledge and careful calibration of both tooling machines. In this respect, the invention, in one embodiment, also comprises the step of transferring the component or portions of the later composite component from one machine to another.

In a further method according to the invention laser the conductive portion is at least partly covered by the non-conductive portion, and laser machining of the non-conductive portion is first carried out until the desired geometry is achieved in the non-conductive portion, and the conductive portion is exposed; then, subsequently the conductive portion is electro machined.

In a further method according to the invention the non-conductive portion is first laser machined and then joined to the conductive portion. The conductive portion may have been electro machined prior to the joining step, or may be machined when the laser-machined non-conductive portion has been joined, the electro-machining step will then take place via the laser-machined opening.

The laser-machining process may likewise take place after the non-conductive and the conductive portion have been joined. The electro-machining process can then have taken place before the joining, or the electro-machining process will take place after the conductive portion has been exposed by the laser-machining process.

In a further method according to the invention a non-conductive coating is produced on a conductive substrate, such as a ceramic thermal barrier coating on a metallic turbine airfoil.

In one mode of carrying out this method the coating is produced to cover the conductive portion, then, for example to produce a cooling air bore, the coating is machined in applying the laser machining step in the desired geometry to expose the substrate, and subsequently the electro machining step of the substrate is performed whereby access for the electro machining tool is provided through said laser machined opening. In a second mode of carrying out the invention, openings, such as cooling bores in a turbine airfoil, are produced in an uncoated conductive workpiece applying the electro machining step. Subsequently the step of coating of least one surface of the conductive part is applied, whereby at least some of the openings produced before are covered by the coating. Then the laser machining step is applied at a position matching an opening in the underlying conductive substrate, thus finally producing an opening, for example a cooling air bore, extending through both the conductive and the non-conductive portions of the composite component.

It will be appreciated by the person skilled in the art that the non-conductive portion may itself be a composite layer, such as a thermal barrier coating covering a metallic substrate, and itself being covered by a wear protection coating and/or an erosion protection coating and/or an impact protection coating.

As mentioned initially, the electro machining process may, as far as the invention is concerned, likewise be an electro discharge machining process or an electro chemical process; the actual choice shall depend on parameters such as the material to be machined, the geometry to be machined, working speed, present know-how, and so forth.

BRIEF DESCRIPTION OF THE DRAWINGS

Embodiments of the invention will now be described in detail with reference to the accompanying drawings in which.

Figure 1:
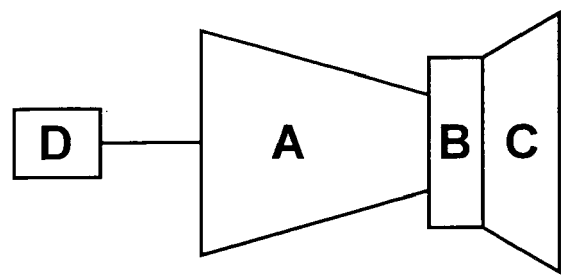
FIG. 1 shows a very schematic drawing of a gas turbine engine.

The drawings are simplified to emphasis the elements enabling a complete appreciation of the invention; thus, the shown embodiments, when reduced to practice, will comprise details not shown in the drawings.

DETAILED DESCRIPTION OF EXEMPLARY EMBODIMENTS

FIG. 1 shows a raw schematic of a gas turbine engine. The engine basically comprises a compressor A, to compress an airflow, a combustion chamber B, in which the compressed airflow is admixed with a fuel, and said fuel is burnt with said compressed airflow, thus producing a high temperature flue gas flow, which is then expanded in the turbine C, thereby providing usable power to drive the compressor A and optionally a load, such as for example generator D. Compressor A and turbine C comprise airfoils arranged in multiple stages of stationary vane rows and moving blade rows. In particular the airfoils of the first turbine stages are subject to high thermal loading during operation, and require cooling.

While the skilled person will readily appreciate the application of the invention to coated components of the combustor, and to very different composite components, which are applied in quite different fields than gas turbines, the invention is discussed in more detail in the context of the production of a cooled turbine airfoil, while not limiting the scope of the claims.

Figure 2:
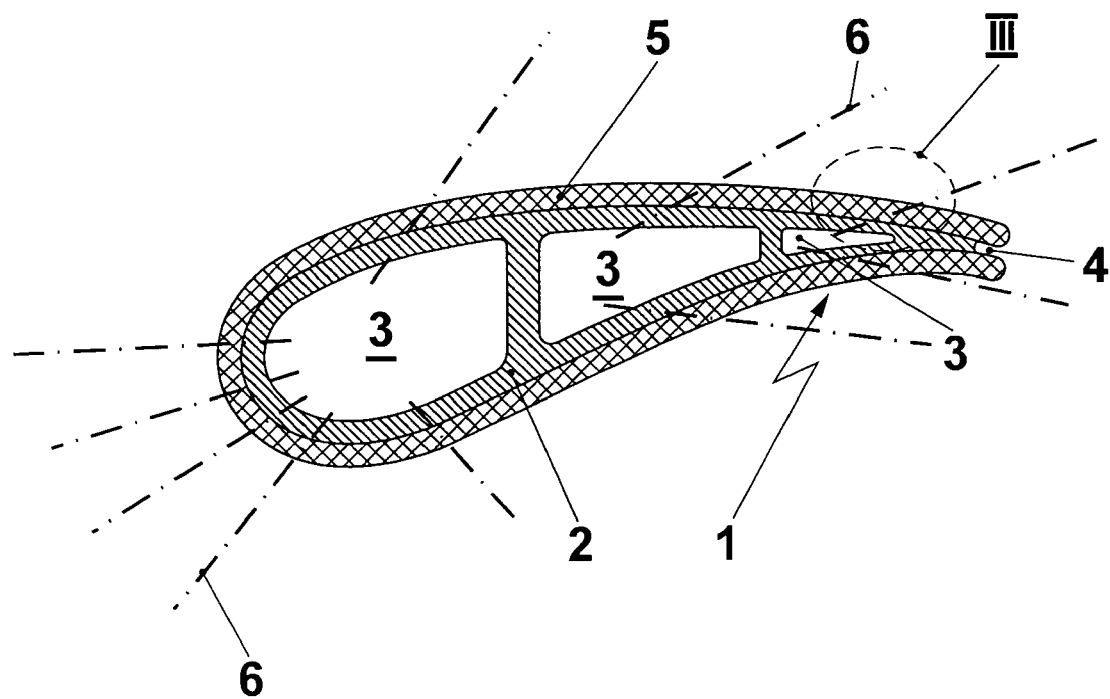
FIG. 2 shows a cross section of an exemplary composite component to be machined.

FIG. 2 shows, as a typical example of a composite component requiring combined machining, an exemplary embodiment of a turbine airfoil 1, as applied in the turbine C of the gas turbine engine shown in FIG. 1. The airfoil typically comprises a hollow-cast metal structure, comprising cooling air channels 3 and cooling air slits 4 at the trailing edge. The cooling air channels 3 and the trailing edge cooling slits are usually produced during the casting process, and require little, if any, machining. The metal structure may consist of, inter alia, Nickel base alloys like those known to the person skilled in the art as Inconel or MarM, and may have been cast applying a single crystal or a directional solidification process. Accordingly, the metal structure has a very sophisticated microstructure, and high mechanical resistance. Application of chipping techniques for further machining is thus almost impractical. Furthermore, chipping techniques of such resistant materials, and to an even larger extend laser cutting techniques, lead to local thermal impacts, and consequently to highly undesirable changes in the metal microstructure. Electro machining methods, such as electro discharge machining, EDM, and electro chemical machining, ECM, are thus the methods of choice in further machining of metallic turbine airfoils which are subject to high temperature exposure. On the other hand, such metallic turbine airfoils for high temperature exposure are commonly coated with a thermal barrier coating, TBC, 5, usually consisting of a high temperature resistant ceramic such as zirkonium oxide $ZrO_2$ or aluminum oxide $Al_2O_3$. In the figure, the coating usually having a thickness of some tenth of a millimeter to some millimeters is shown enlarged in relation to the metallic structure, for better visibility. The cooling air channels 3 are in practice bent cavities, which are practically inaccessible by a tool, and the non-conductive ceramic coating 5 prevents the access of an electro machining tool to the conductive, metallic portion 2 of the airfoil. The non-conductive coating, as a matter of course, can not be machined applying an electro machining process.

Turbine airfoils, like the one shown in FIG. 2, usually require a multitude of cooling air bores, as indicated by dash-dotted lines 6, which allow cooling air to flow from the cooling air channels 3 onto the airfoil outer surface, thus preventing hot turbine working fluid from direct contact with the airfoil, and thus notably decreasing the thermal loading of the airfoil during turbine operation. This multitude of cooling air bores usually can not be cast with the required accuracy at a reasonable cost, and thus the application of a high precision machining process is required.

Figure 3:
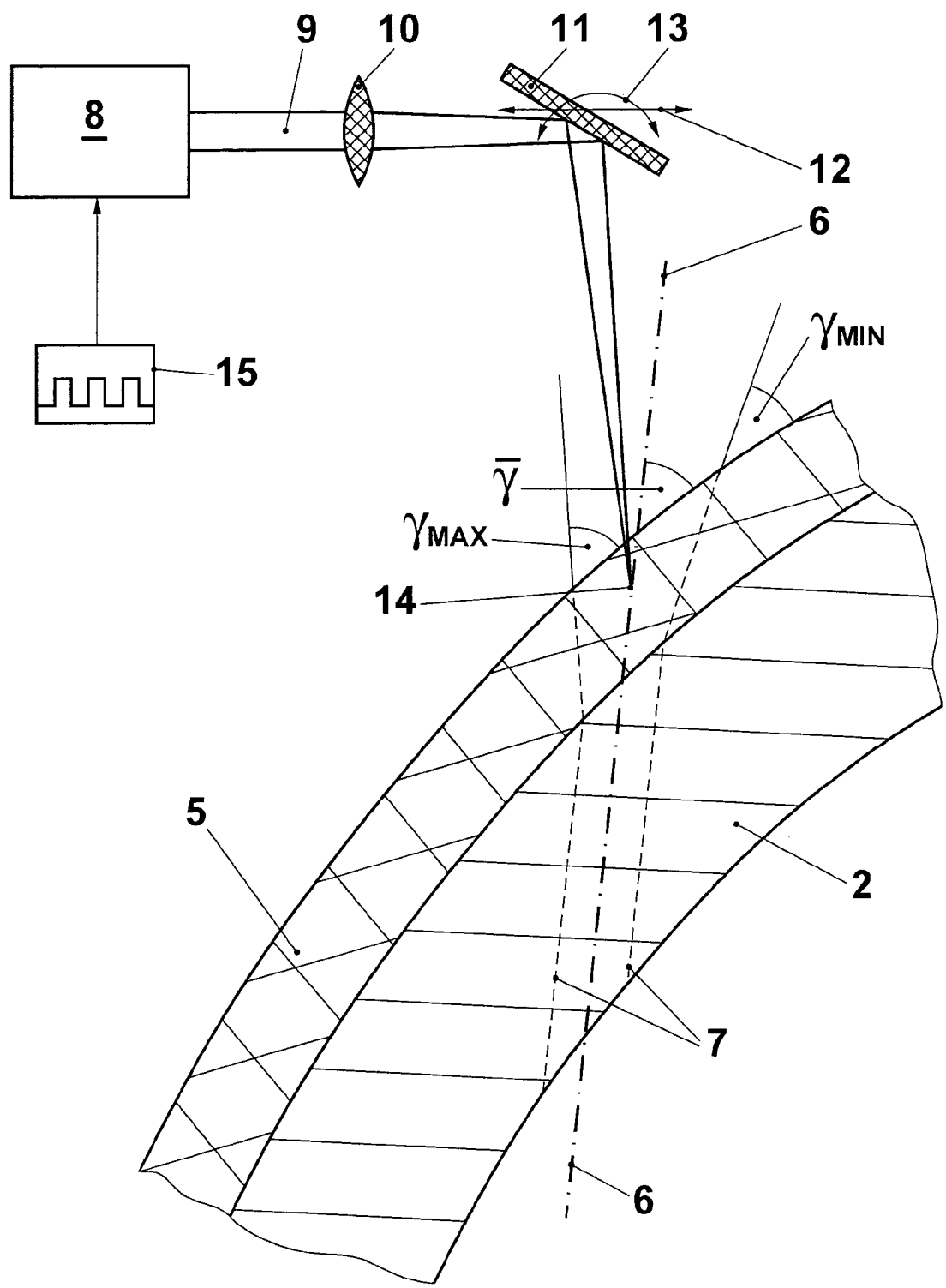
FIG. 3 shows an enlarged view of the cross section in a region to be machined applying a method according to the invention, and a schematic of a laser machining assembly applied.
Figure 4A:
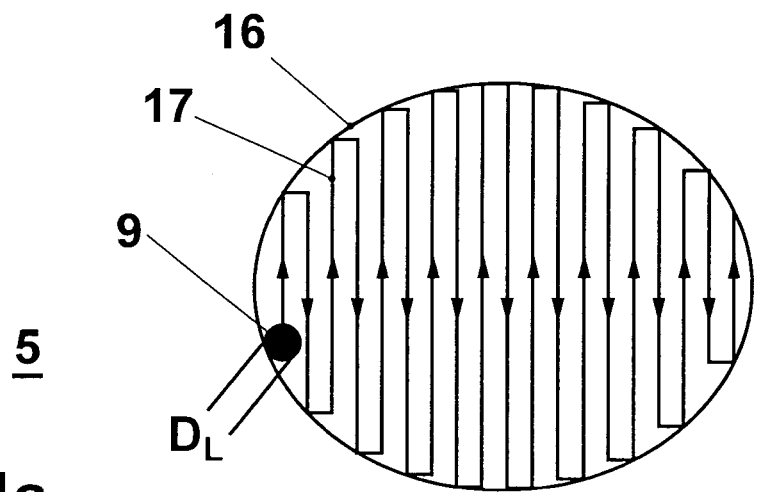
FIG. 4 shows a top view of the component in a region to be machined, illustrating possible movements of the laser beam over the workpiece surface.
Figure 4B:
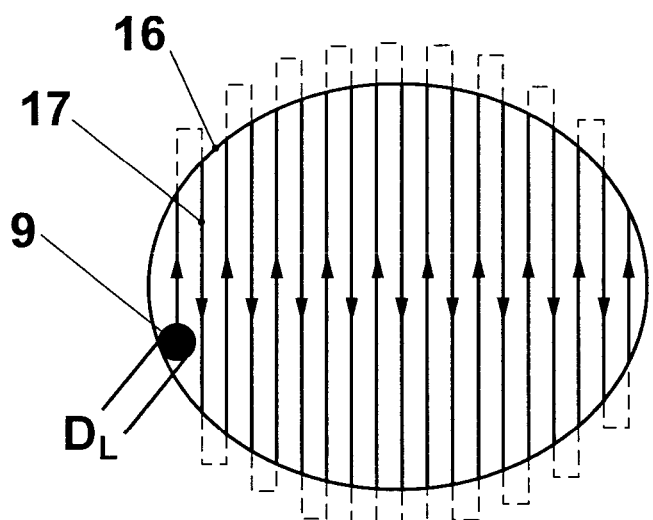
Figure 4C:
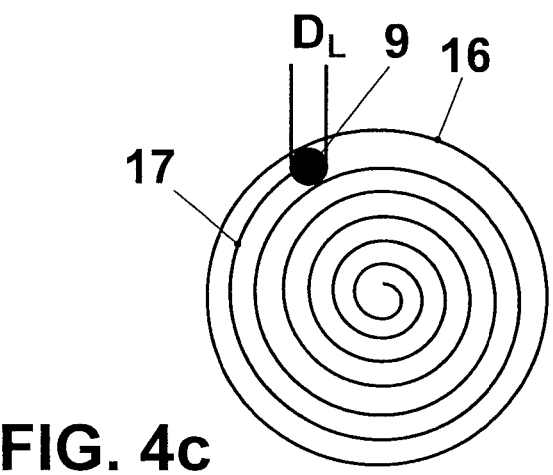
Figure 4D:
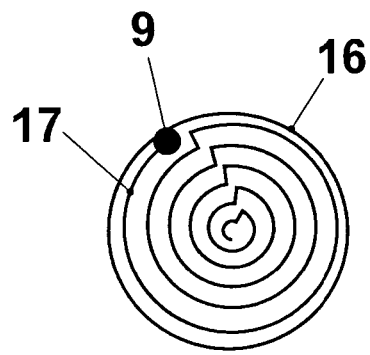

FIG. 3 shows detail III as indicated in FIG. 2. The contours of the cooling air bore to be manufactured are indicated by dashed lines 7. While in this example the bore is cylindrical in the conductive metal portion 2, this is not a necessary restriction. In the non-conductive portion 5 a fan-shaped contour is to be manufactured. The mean angle of incidence as defined by the bore center line 6 is indicated as $\bar{\phi}$; the minimum and maximum angles of incidence are indicated as $\phi_{MIN}$ and $\phi_{MAX}$, respectively. It is appreciated that the opening angle might be unsymmetric with respect to center line 6, and may vary in different directions. In applying conventional laser drilling methods a laser beam would just be used to burn through the coating 5. The laser beam diameter in the working region would then equal the diameter of the circular cross section hole to be machined. Apparently, the machined opening geometry is then restricted to a circular cross section, or, as the projection appearing in the component surface, an elliptical shape. It is furthermore well-understood, that in applying such a method only a symmetric conical opening can be produced, with the opening angle roughly equaling the convergence angle of the laser beam. It is moreover understood that in applying such a method a considerable heat flux into the surrounding material is present, and furthermore the laser drilling would inadvertently occur in at least a part of the underlying metal substrate. Due to these effects detrimental local structural transformations in the metal microstructure would occur, and the bond between the conductive and the non-conductive portions of the component would be considerably weakened, thus providing a location for later severe damages. Experience has furthermore shown, that in applying the conventional laser drilling technique quite large tolerances must be accepted. The variance of the cooling air throughflow of conventionally produced cooling air bores has been determined to be as large as ±10% of the mean value.

According now to principles of the present invention, a laser 8, emitting a laser beam 9, is applied. The laser beam is focussed by an collimation system, here represented by convex lens 10. It will be appreciated, that the optical system applied in practice will be more complicated, and mirror optics might be preferred, as they do not effect any transmission losses. A deflection assembly such as indicated by mirror 11 is applied to define the direction of the laser beam. The mirror is shown to be transversally movable as indicated by arrow 12, and also to apply a swiveling movement as indicated by 13. The arrangement of optical components and the workpiece is chosen such that laser beam focus 14 is located on or close to the non-conductive portion surface, and advantageously inside the non-conductive portion 5. With respect to the deflection assembly, as well as with respect to the entire optical set-up, it is well-understood that the shown device is largely simplified to illustrate the basic functions. The skilled person will appreciate, that an arrangement comprising multiple moveable mirrors will allow superior position control of the focus and/or laser beam working range. Furthermore, other deflection devices like prisms or optical fibres bearing a focusing optics at their tips may be applied without changing the scope of the invention. It shall furthermore be noted, that such laser systems providing a possibility to move the beam and even to move it along a pre-programmed trace are off-shelf available as engraving laser systems. The laser used in one embodiment is a Nd:YAG (neodynium yttrium-aluminum-garnet, $Y_5Al_5O_{12}$) laser; however, it will be appreciated that alternative types of lasers can also be used. The laser power is, among others, determined by the properties of the electrically non-conductive coating to be machined. It will be appreciated by a person skilled in the art that speed and cost considerations are also relevant. Lasers with power ratings of between 35W and 400W and laser intensities in excess of $2 \cdot 10^8$ W/cm$^2$ will be well-suited for most applications. It is furthermore indicated by control device 15 that the laser operation will in one exemplary embodiment be pulsed, preferably in a range from 3 kHz-50 kHz. It is then advantageous if laser 8 is a Q-switched laser. The optical assembly is chosen to achieve a very narrow focus. Thus, if the focus is placed very close to the surface of the material to be machined, the working diameter of the beam is small. It is essential for the invention that the working diameter is substantially smaller then the geometry to be machined, as discussed above. Thus, for the production of a order of magnitude 0.5 mm diameter opening a 10 μm-30 μm diameter working beam may be applied. In applying a narrow angle focusing system, i.e., in applying a collimation optic with a high focal length, the usable part of the laser beam might be comparably large, such as for example 10 mm.

It has been well-established in applying laser drilling techniques that the minimum angle of incidence φ MIN is limited to approximately 21 degrees, due to reflection of the laser beam when the angle becomes smaller. It has been found that applying the method according to the invention laser machining at angles φ flatter than 20 degrees, even as flat as 12 degrees, in a preferred embodiment 15 degrees, may be performed.

FIG. 4 now shows a top view of the detail of FIG. 3, as seen in the direction of the incident laser beam. To machine a circular contour 16 the laser beam 9 of diameter $D_L$ which is obviously substantially smaller than the contour to be manufactured, as discussed above, is for example led over the surface of the non-conductive portion 5 in a set of parallel traces 17, as shown in FIGS. 4a and 4b. The trace of the laser beam can be completely inside the contour to be ablated, as shown in FIG. 4a, with the laser continuous or pulsed operation continuing throughout the whole machining step, or the scanned area is bigger than the geometry and the laser is operated in a way that it is out of operation while the beam is located outside the contour to be abraded, as indicated by the dashed portions of the laser beam trace in FIG. 4b. Helical or quasi-helical movement of the laser beam can be applied for appropriate contours, as illustrated in FIG. 4c. Also, circular-staged or elliptically-stages scanning mode may be applied, as indicated in FIG. 4c. There might be a further set of traces at an angle to the first set of traces, for example essentially perpendicular to the first one. Laser assemblies used for engraving and marking are off-shelf available, where the path of the laser beam is already readily programmed for a multitude of contours, and such assemblies may advantageously be applied in the proposed method. The laser beam and/or the workpiece might furthermore be swiveled into various angles of inclination, thus enabling the machining of 3-dimensional freeforms, as for example the conical geometry shown in FIG. 3, where the angle of incidence will be varied from $\phi_{MIN}$ to $\phi_{MAX}$ during the laser machining process. The machining depth can be continuously monitored, for example by a conoscopic probe.

Figure 5:
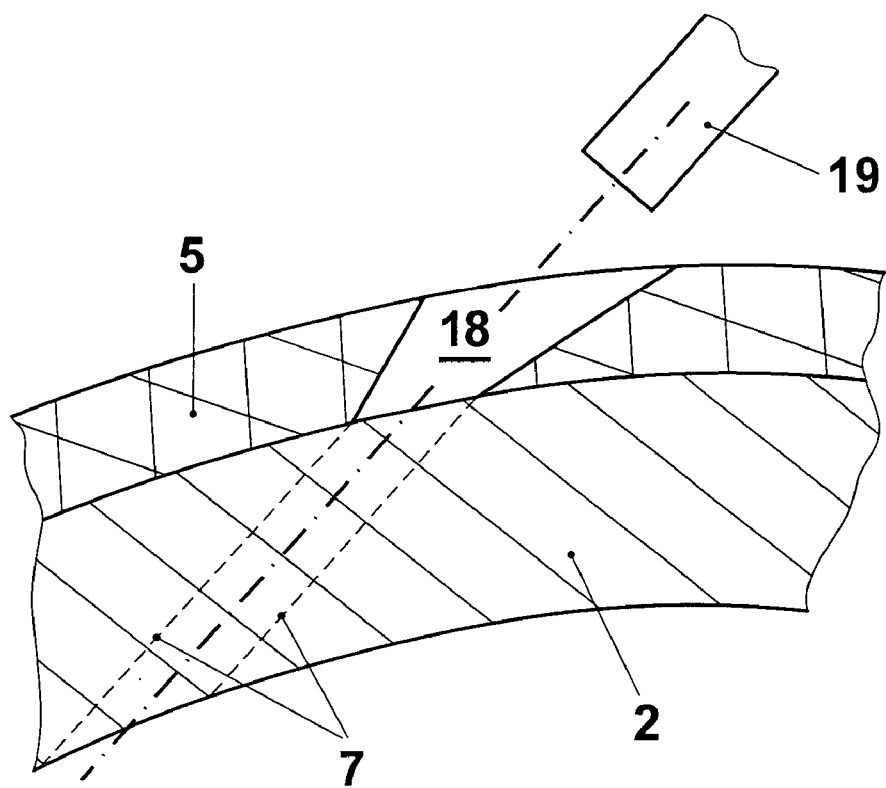
FIG. 5 shows the cross section of FIG. 3 after the laser machining step.

FIG. 5 shows the detail of FIG. 4 after the laser machining step has been carried out. Opening 18 has been produced in the non-conductive coating, thus exposing the conductive portion 2 for access by an electro machining tool 19, such that the subsequent electro machining step can be performed.

Figure 6:
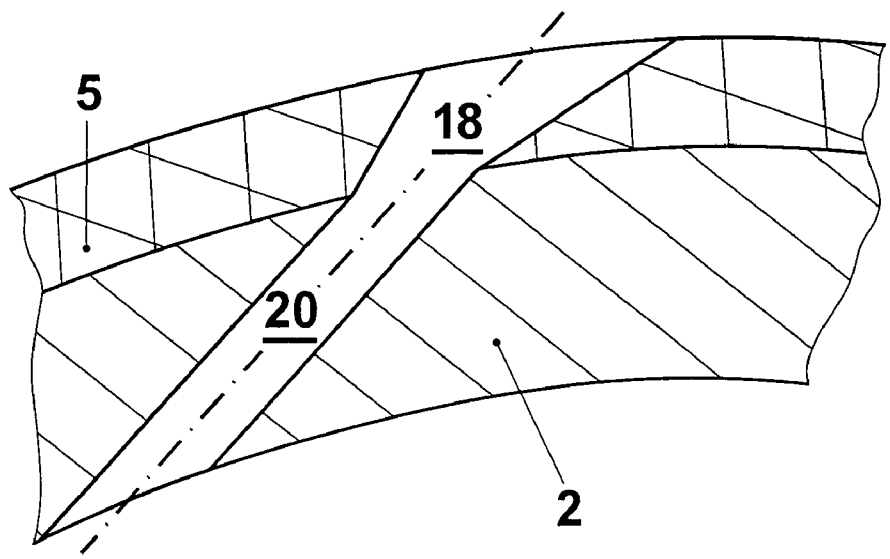
FIG. 6 shows the cross section of FIGS. 3 and 5 after the electro machining step.

Referring to FIG. 6, the machining process has been completed. Laser machined opening 18 in the non-conductive portion 5 and electro machined opening 20 in the conductive portion form a cooling air bore. It has been found, that, in applying the method according to the invention the accuracy in producing the cooling air bores can be largely improved, and the variance in the cooling air mass flow can be achieved as low as ±1%.

Figure 7A:
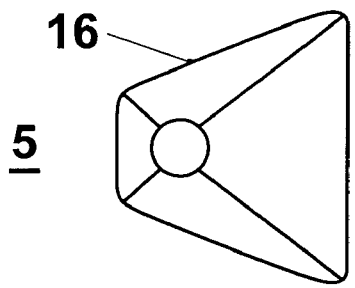
FIG. 7 shows an example of a further possible geometry which can be achieved using the laser machining step according to the invention.
Figure 7B:
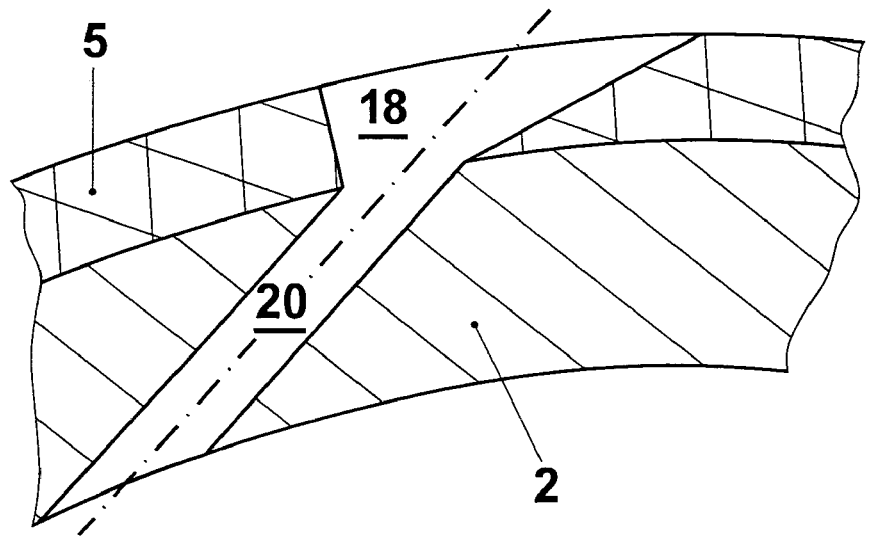

FIG. 7 illustrates a fan-shaped cooling air exit on the surface of a cooled component. FIG. 7a shows a top view of the opening, while FIG. 7b shows a cross sectional view. In operation cooling air is supplied through bore 20 which has been electro machined in conductive portion 2. The contour of the outlet 20 is laser machined in the non-conductive portion. The contour of opening 16 is trapezoidally shaped. Such contours are widely applied on gas turbine airfoils. It will be appreciated by the skilled person that the shown geometry can not be manufactured by means of conventional laser drilling as described above, but can easily be achieved applying the method according to the invention, as, with a small laser beam, nearly arbitrary contours can be manufactured, and, by varying the laser beam incident angle during the laser machining step, the cross sectional contour can also easily be varied.

Figure 8:
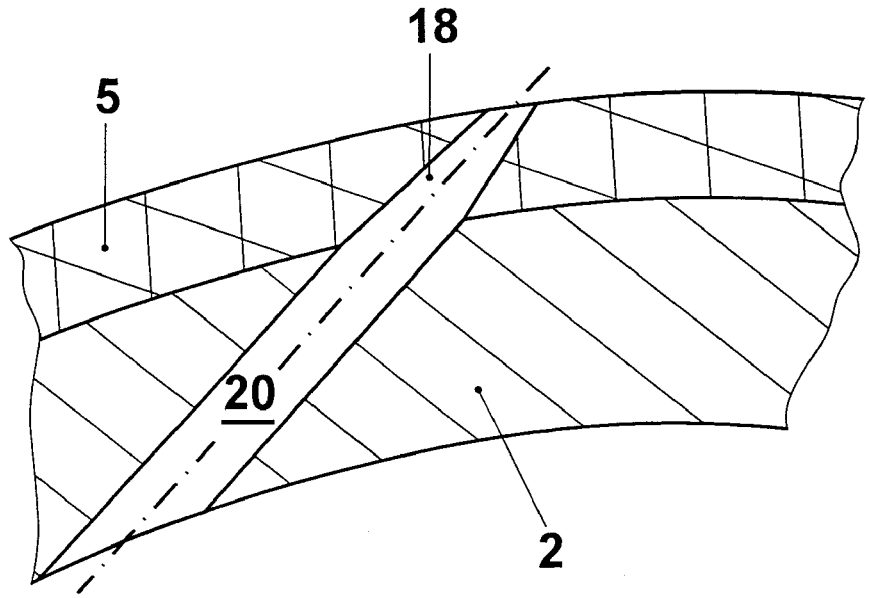
FIG. 8 shows yet another example of a possible geometry which can be achieved using the laser machining step according to the invention.

Even geometries as shown in FIG. 8, with the opening 18 in the non-conductive portion tapering towards the surface, can easily be manufactured with tool access from the non-conductive portion surface.

In an alternative mode of carrying out the invention of the invention, the non-conductive portion 5 is machined using a laser prior to joining it to the conductive portion 2. In this case it is important to ensure that the non-conductive portion 5 and the conductive portion 2 are positioned correctly with reference to each other, in order to ensure that the desired material is fully removed from the conductive portion 2 during the electro machining process. This positioning may be carried out automatically using scanning and positioning apparatus in the machine. Similarly, the conductive portion 2 could be machined prior to joining it to the non-conductive portion 5.

In a further alternative mode of carrying out the invention, the non-conductive portion 5 and conductive portion 2 may be machined separately but simultaneously. The machining may be carried out on two different machines. However, it is also possible to carry out simultaneous machining on a single machine which has a laser as well as an electro machining apparatus. Again, it is important to position the layers 2 and 3 correctly with respect to one another following machining, in order to ensure that the holes in both portions are properly aligned with each other.

While the method has been explained in detail in the context of a gas turbine airfoil, the method might apparently be likewise applied for the machining of cooling air bores in other thermally loaded engine components, as in gas turbine combustor wall elements. It is furthermore apparent to the skilled person that the method might advantageously be applied for the machining of other composite or coated components, whereby the non-conductive layers are by far not limited to thermal barrier coatings, but may be for the purpose of wear protection, friction minimization, protection against chemical erosion, and so on, and any composite layer consisting of any suitable combination of the aforementioned.

LIST OF REFERENCE NUMERALS 1 composite component
2 conductive portion, substrate
3 cavity, cooling air channel
4 cooling air slit
5 non-conductive portion, protective layer
6 axis of cooling air bore
7 contour of cooling air bore
8 laser
9 laser beam
10 collimation optics
11 deflection assembly
12 transversal movement
13 swiveling movement
14 laser beam focus
15 control device
16 contour
17 laser beam trace on the workpiece surface, scanning trace
18 laser machined opening
19 electro machining tool
20 electro machined opening
A compressor
B combustor
C turbine
D generator
$\phi$ angle of incidence While the invention has been described in detail with reference to exemplary embodiments thereof, it will be apparent to one skilled in the art that various changes can be made, and equivalents employed, without departing from the scope of the invention. Each of the aforementioned documents is incorporated by reference herein in its entirety.

What is claimed is:

1. A method of producing a composite component, said component comprising an electrically non-conductive portion and an electrically conductive portion, and the component having at least one well-defined machined geometry, wherein the electrically non-conductive portion is machined by a laser and the electrically conductive portion is machined by electro machining, said method comprising:
  applying a focussed laser equipment having focus diameter ($D_L$) substantially smaller than the geometry to be machined;
  placing the laser onto the non-conductive portion surface in such a way that the beam diameter ($D_L$) on the surface is substantially smaller than the geometry to be machined;
  applying the laser beam of the focussed laser equipment;
  leading the laser beam over the non-conductive portion surface following a defined path, thus engraving the desired geometry into the non-conductive portion;
  laser machining the non-conductive portion; and
  after said laser machining the non-conductive portion, joining the laser-machined non-conductive portion to the conductive portion.

2. The method as claimed in claim 1, wherein the electro machining process and the laser machining process are carried out on different apparatuses.

3. The method as claimed in claim 2, further comprising:
  physically removing the component from a first machining apparatus; and
  transferring said component to a second machining apparatus between the electro machining process and the laser machining process.

4. The method as claimed in claim 1, further comprising:
  electro machining the conductive portion prior to the joining of the conductive and the non-conductive portion.

5. A method according to claim 1, wherein leading a movable deflection assembly comprises leading a mirror assembly.

6. A method as claimed in claim 1, wherein leading the laser beam over the non-conductive portion surface comprises transversely and pivotally moving said deflection assembly to guide the laser beam.

7. The method as claimed in claim 1, further comprising prior to said laser placing:
  applying a conductive substrate as the conductive portion; and then
  producing a non conductive coating on at least a part of a surface of the conductive substrate, to form the non-conductive portion.

8. The method as claimed in claim 7, further comprising:
electro machining the conductive substrate prior to said producing a non conductive coating.

9. The method as claimed in claim 1, comprising:
performing the laser machining process of the non-conductive portion;
once the laser machining process has been completely performed, thus having exposed the conductive portion, accessing the conductive portion with an electro-machining tool though the laser machined opening in the non-conductive portion; and
performing the electro-machining process of the conductive portion.

10. The method as claimed in claim 1, wherein said electro machining comprises electro discharge machining or electrochemical machining.

11. The method as claimed in claim 1, comprising:
producing non-circular cross section openings in the non-conductive portion.

12. The method as claimed in claim 1, further comprising:
swiveling at least one of the laser beam and the component into different incident angles ($\phi$) with respect to the non-conductive portion surface.

13. The method as claimed in claim 12, comprising:
producing a 3-dimensional freeform opening in the non-conductive portion.

14. The method as claimed in claim 1, comprising:
performing said laser machining at an angle of incidence ($\phi$), as measured against the non-conductive portion surface, of less than 20 degrees.

15. The method as claimed in claim 14, wherein said angle of incidence is between 20 degrees and 12 degrees.

16. The method as claimed in claim 1, comprising:
pulsing the laser beam.

17. The method as claimed in claim 16, wherein pulsing comprises pulsing the laser beam at a frequency in excess of 500 Hz.

18. The method as claimed in claim 16,
wherein pulsing the laser beam comprises pulsing with a Q-switched laser.

19. A method according to claim 1, wherein placing the laser onto the non-conductive portion surface comprises placing the laser focus onto the surface or inside the non-conductive portion.

* * * * *